US012786020B2

(12) United States Patent
Jang et al.

(10) Patent No.: US 12,786,020 B2
(45) Date of Patent: Nov. 3, 2026

(54) METHOD, APPARATUS, AND SYSTEM FOR SERIAL ISOLATED COMMUNICATION

(71) Applicant: Nextchip Co., Ltd., Seongnam-si (KR)

(72) Inventors: Hee Don Jang, Seongnam-si (KR); E Woo Chon, Seoul (KR); Ho Hyon Song, Seoul (KR)

(73) Assignee: Nextchip Co., Ltd., Seongnam-si (KR)

( * ) Notice: Subject to any disclaimer, the term of this patent is extended or adjusted under 35 U.S.C. 154(b) by 63 days.

(21) Appl. No.: 18/904,375

(22) Filed: Oct. 2, 2024

(65) Prior Publication Data

US 2025/0119325 A1 Apr. 10, 2025

(30) Foreign Application Priority Data

Oct. 5, 2023 (KR) ........................ 10-2023-0132551

(51) Int. Cl.
*H04L 25/08* (2006.01)
*H04L 25/49* (2006.01)

(52) U.S. Cl.
CPC .............. *H04L 25/08* (2013.01); *H04L 25/49* (2013.01)

(58) Field of Classification Search
CPC ... H04W 40/005; H04W 40/10; H04W 40/22; H04W 40/248; H04W 48/12; H04W 56/00; H04W 56/0015; H04W 56/002; H04L 45/127; H04L 12/2801; H04L 65/1069; H04L 12/66; H04L 69/329; H04L 65/1026; H04L 65/1036; H04L 65/80; H04B 1/7143; H04B 17/318; H04B 7/15; H04B 3/23; H04B 3/234; H04B 1/1081; H04B 7/0443; H04B 7/0469; H04B 7/0615
See application file for complete search history.

(56) References Cited

U.S. PATENT DOCUMENTS

2011/0235737 A1* 9/2011 Hashimoto ......... H04L 25/0266 375/285
2014/0307759 A1* 10/2014 Sundar ...................... H04B 1/40 375/219
2020/0073848 A1* 3/2020 Goekjian ............ G06F 13/4291
2021/0109886 A1* 4/2021 Vaarlid ................... G06F 13/10
2022/0163936 A1* 5/2022 Liu ........................ G01D 21/02
(Continued)

FOREIGN PATENT DOCUMENTS

KR 2013-0024787 A 3/2013
KR 2023-0101451 A 7/2023
(Continued)

*Primary Examiner* — Eva Y Puente
(74) *Attorney, Agent, or Firm* — DALY, CROWLEY, MOFFORD & DURKEE, LLP

(57) ABSTRACT

A method of transmitting data, performed by a transmission device of a serial isolated communication system includes obtaining data to be transmitted, generating a plurality of data sets having 2 bits based on the data, determining a plurality of data pulse signals by encoding the plurality of data sets according to a preset rule, and transmitting the plurality of data pulse signals to a reception device of the serial isolated communication system. Each of the plurality of data pulse signals is composed of any two pulses of a first positive pulse having a first amplitude, a second positive pulse having a second amplitude, a first negative pulse having the first amplitude, or a second negative pulse having the second amplitude.

13 Claims, 11 Drawing Sheets

(56) References Cited

U.S. PATENT DOCUMENTS

2023/0208684 A1* 6/2023 Lee .................... H04L 25/0284
375/262
2023/0393931 A1* 12/2023 Wu .................... G06F 11/0772

FOREIGN PATENT DOCUMENTS

WO WO 98/32238 7/1998
WO WO 2021/092257 A1 5/2021

* cited by examiner

METHOD, APPARATUS, AND SYSTEM FOR SERIAL ISOLATED COMMUNICATION

CROSS-REFERENCE TO RELATED APPLICATION

This application claims the benefit of Korean Patent Application No. 10-2023-0132551 filed on Oct. 5, 2023, in the Korean Intellectual Property Office, the entire disclosure of which is incorporated herein by reference for all purposes.

BACKGROUND

1. Field of the Invention

The present disclosure relates to a method, apparatus, and system for serial isolated communication, and more particularly, to a method, apparatus, and system for serial isolated communication between isolated devices.

2. Description of the Related Art

As in a case of a battery management system, serial isolation communication methods are commonly used between isolated devices that may not share a ground. In order to provide communication between isolated devices, a paired serial communication method is mainly used. For paired serial communications (e.g., universal asynchronous receiver and transmitter (UART), serial peripheral interface (SPI), etc.), a method of transmitting one-bit data to one clock is commonly used. Also, in order to transmit specific signals (e.g., CSB_low/CSB_high for SPI, START/STOP for UART, etc.) other than data, a method different from the method of transmitting bit data is required, and for example, a method of distinguishing bit data and specific signals using a width of a pulse or a difference in width between pulses is used.

The method of transmitting one-bit data to one clock may reduce a transmission speed of data, since only one-bit data may be transmitted to one signal. There is a need to provide a communication method to improve transmission efficiency.

SUMMARY

The present disclosure is to solve the above-mentioned problems and other problems.

A method, apparatus, and system for serial isolated communication according to an embodiment may improve transmission efficiency of paired serial communication among the technologies.

A method, apparatus, and system for serial isolated communication according to an embodiment may provide bidirectional multi-data communication using directions of pulses and changes of amplitudes.

However, the technical aspects are not limited to the aforementioned aspects, and other technical aspects may be present.

According to an aspect, there is provided a method of transmitting data, performed by a transmission device of a serial isolated communication system, the method including obtaining data to be transmitted, generating a plurality of data sets having 2 bits based on the data, determining a plurality of data pulse signals by encoding the plural data sets according to a preset rule, and transmitting the plural data pulse signals to a reception device of the serial isolated communication system, wherein each of the plural data pulse signals is composed of any two pulses of a first positive pulse having a first amplitude, a second positive pulse having a second amplitude, a first negative pulse having the first amplitude, or a second negative pulse having the second amplitude.

The transmitting of the plural data pulse signals to the reception device of the serial isolated communication system may include transmitting a start pulse signal to the reception device of the serial isolated communication system, transmitting the plural data pulse signals to the reception device of the serial isolated communication system, and transmitting an end pulse signal to the reception device of the serial isolated communication system.

The start pulse signal and the end pulse signal may be different signals each composed of any two pulses of the first positive pulse, the second positive pulse, the first negative pulse, or the second negative pulse.

The second amplitude may be two times the first amplitude.

The serial isolated communication system may be implemented to support a serial peripheral interface (SPI) communication method.

The serial isolated communication system may be implemented to support a universal asynchronous receiver and transmitter (UART) communication method.

When a first bit and a second bit of a first data set among the plural data sets are identical to each other, a first data pulse signal corresponding to the first data set may be composed of the first negative pulse having the first amplitude and the first positive pulse having the first amplitude.

When a first bit and a second bit of a second data set among the plural data sets are different from each other, a second data pulse signal corresponding to the second data set may be composed of the second negative pulse having the second amplitude and the second positive pulse having the second amplitude.

When a first bit and a second bit of a first data set among the plural data sets are identical to each other, a first data pulse signal corresponding to the first data set may be composed of the first positive pulse having the first amplitude and the second negative pulse having the second amplitude.

When a first bit and a second bit of a first data set among the plural data sets are identical to each other, a first data pulse signal corresponding to the first data set may be composed of the second positive pulse having the second amplitude and the first negative pulse having the first amplitude.

When a first bit and a second bit of a first data set among the plural data sets are identical to each other, a first data pulse signal corresponding to the first data set may be composed of the second positive pulse having the second amplitude and the second negative pulse having the second amplitude.

The transmitting of the plurality of data pulse signals to the reception device of the serial isolated communication system may include transmitting the plurality of data pulse signals to the reception device of the serial isolated communication system through a first pin of a controller of the transmission device.

The transmitting of the plurality of data pulse signals to the reception device of the serial isolated communication system may further include transmitting a plurality of complementary data pulse signals complementary to the plurality of data pulse signals to the reception device of the serial isolated communication system through a second pin of the controller of the transmission device.

According to another aspect, there is provided a transmission device of a serial isolated communication system, the transmission device including at least one controller, and a communicator configured to perform communication of the controller, wherein the controller is configured to perform obtaining data to be transmitted, generating a plurality of data sets having 2 bits based on the data, determining a plurality of data pulse signals by encoding the plurality of data sets according to a preset rule, and transmitting the plurality of data pulse signals to a reception device of the serial isolated communication system, and each of the plurality of data pulse signals is composed of any two pulses of a first positive pulse having a first amplitude, a second positive pulse having a second amplitude, a first negative pulse having the first amplitude, or a second negative pulse having the second amplitude.

The transmitting of the plurality of data pulse signals to the reception device of the serial isolated communication system may include transmitting a start pulse signal to the reception device of the serial isolated communication system, transmitting the plurality of data pulse signals to the reception device of the serial isolated communication system, and transmitting an end pulse signal to the reception device of the serial isolated communication system.

The transmitting of the plurality of data pulse signals to the reception device of the serial isolated communication system may include transmitting the plurality of data pulse signals to the reception device of the serial isolated communication system through a first pin of a controller of the transmission device.

The transmitting of the plurality of data pulse signals to the reception device of the serial isolated communication system may further include transmitting a plurality of complementary data pulse signals complementary to the plurality of data pulse signals to the reception device of the serial isolated communication system through a second pin of the controller of the transmission device.

According to another aspect, there is provided a method of receiving data, performed by a reception device of a serial isolated communication system, the method including receiving a plurality of data pulse signals from a transmission device of the serial isolated communication system, determining a plurality of data sets having 2 bits by decoding the plurality of data pulse signals according to a preset rule, and obtaining data based on the plurality of data sets, wherein each of the plurality of data pulse signals is composed of any two pulses of a first positive pulse having a first amplitude, a second positive pulse having a second amplitude, a first negative pulse having the first amplitude, or a second negative pulse having the second amplitude.

The receiving of the plurality of data pulse signals from the transmission device of the serial isolated communication system may include receiving a start pulse signal from the transmission device of the serial isolated communication system, receiving the plurality of data pulse signals from the transmission device of the serial isolated communication system, and receiving an end pulse signal from the transmission device of the serial isolated communication system.

When a first bit and a second bit of a first data set among the plurality of data sets are identical to each other, a first data pulse signal corresponding to the first data set may be composed of the first positive pulse having the first amplitude and the first negative pulse having the first amplitude.

When a first bit and a second bit of a second data set among the plurality of data sets are different from each other, a second data pulse signal corresponding to the second data set may be composed of the second positive pulse having the second amplitude and the second negative pulse having the second amplitude.

Additional aspects of embodiments will be set forth in part in the description which follows and, in part, will be apparent from the description, or may be learned by practice of the disclosure.

According to at least one of embodiments of the present disclosure, a method, apparatus, and system for serial isolation communication with improved transmission efficiency may be provided.

According to at least one of embodiments of the present disclosure, a method, apparatus, and system for serial isolated communication in which bidirectional multi-data communication is implemented may be provided.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
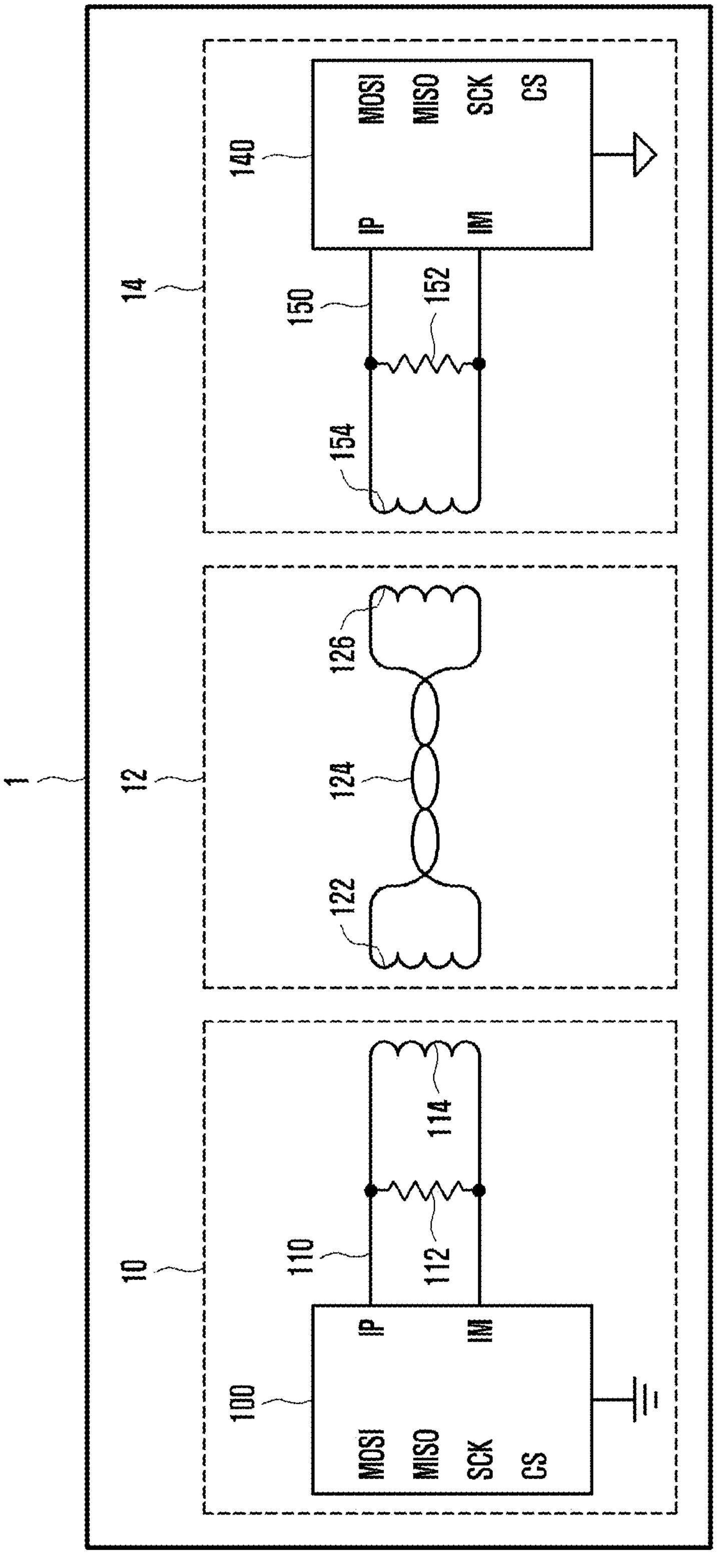
FIG. 1 illustrates an example of a system of a plurality of electronic devices configured to perform serial isolated communication according to an embodiment.

The following detailed structural or functional description is provided as an example only and various alterations and modifications may be made to the examples. Accordingly, the examples are not construed as limited to the disclosure and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, or similarly, the second component may be referred to as the first component.

It should be noted that if it is described that one component is "connected" to another component, a third component may be "connected" between the first and second components, although the first component may be directly connected to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, should be construed to have meanings matching with contextual meanings in the relevant art, and are not to be construed to have an ideal or excessively formal meaning unless otherwise defined herein.

Hereinafter, the embodiments will be described in detail with reference to the accompanying drawings. When describing the embodiments with reference to the accompanying drawings, like reference numerals refer to like elements and a repeated description related thereto will be omitted.

FIG. 1 illustrates an example of a system of a plurality of electronic devices configured to perform serial isolated communication according to an embodiment.

Referring to FIG. 1, a serial isolated communication system 1 may include a first electronic device 10, a connecting device 12, and a second electronic device 14 configured to perform serial isolation communication.

According to an embodiment, the serial isolated communication system 1 may be implemented to support a serial peripheral interface (SPI) communication method. For example, the first electronic device 10 and the second electronic device 14 may be bidirectional communication interface devices. For example, the connecting device 12 may be a cable device for performing communication between bidirectional communication interface devices (e.g., the first electronic device 10 and the second electronic device 14).

For example, the first electronic device 10 and the second electronic device 14 may communicate with each other in master and slave modes, respectively. The first electronic device 10 and the second electronic device 14 may be isolated devices that may not share a ground, since they are connected to different power sources and grounds.

Referring to FIG. 1, the first electronic device 10 may include a first controller 100 and a first communicator. The first communicator may include a first transmission line 110, a first resistor 112, and a first portion 114 of a first isolator. The first electronic device 10 may communicate with the second electronic device 14 through the first communicator.

When the first electronic device 10 is in a master mode, the first controller 100 of the first electronic device 10 may be connected to a first master device (e.g., a microcontroller, etc.). The first controller 100 may communicate with the first master device through a master output/slave input (MOSI) terminal, a master input/slave output (MISO) terminal, a serial clock (SCK) (or CLK) terminal, and a chip select (CS) (or CSB) terminal which transmit/receive a MOSI signal, a MISO signal, a SCK (CLK) signal, and a CS (CSB) signal, respectively. The connection between the first controller 100 of the first electronic device 10 and the first master device may include MOSI, MISO, SCK (or CLK), and CS (or CSB) signals. The first controller 100 may receive a MOSI signal from the first master device through the MOSI terminal. The first controller 100 may receive a clock signal from the first master device through the SCK terminal. The first controller 100 may receive a CS signal from the first master device through the CS terminal.

When the first electronic device 10 is in a master mode, the first controller 100 may receive signals of the MOSI signal, the SCK signal, and the CS signal from the first master device. The first controller 100 may convert the received signals into a communication signal and output the communication signal to the first transmission line 110. In addition, the first controller 100 may extract a MISO signal based on the communication signal received from the first transmission line 110, and transmit the extracted MISO signal to the first master device. The communication signal output to the first transmission line 110 may transmit to a second communication line 150 of the second electronic device 14 through the connecting device 12. A second controller 140 of the second electronic device 14 may extract MOSI, SCK, and CS signals from the communication signal received at the second transmission line 150, and transmit the extracted signals to a first slave device.

Each component of the first electronic device 10 may be connected with the first transmission line 110. A first resistor 112 may be designed to match a specific impedance of the transmission lines in order to maximize data transmission efficiency between the first controller 100 and the second controller 140 and minimize reflection on the lines.

The data may be transmitted over an isolation boundary of the first electronic device 10 and the connecting device 12 through first isolators. The first isolators may include the first portion 114 of the first isolator and a second portion 122 of the first isolator. The first electronic device 10 and the connecting device 12 are electrically isolated from each other, and therefore, the data may be transmitted through magnetic field changes and/or another methods using the first isolator. FIG. 1 illustrates an example in which an inductive isolation device is used as an isolator, and configurations and methods for implementing the isolator are not limited to the described embodiments. For example, a capacitive isolation device may be used as the isolator.

Referring to FIG. 1, the connecting device 12 may include the second portion 122 of the first isolator, a daisy chain 124, and a first portion 126 of a second isolator.

The first portion 114 of the first isolator and the second portion 122 of the first isolator may be used so that the data is transmitted over the isolation boundary of the first electronic device 10 and the connecting device 12. The first portion 126 of the second isolator and a second portion 154 of the second isolator may be used so that the data is transmitted over the isolation boundary of the connecting device 12 and the second electronic device 14.

The first electronic device 10 and the second electronic device 14 may communicate with each other through the daisy chain 124 of the connecting device 12. For example, the daisy chain 124 may be a wiring type in which two conductors are twisted together. The daisy chain 124 may include a twisted pair cable. The daisy chain 124 may offset electromagnetic interference from an external source. According to an embodiment, the daisy chain 124 may be omitted or replaced with another component.

Referring to FIG. 1, the second electronic device 14 may include the second controller 140 and a second communicator. The second communicator may include a second transmission line 150, a second resistor 152, and the second portion 154 of the second isolator. The second electronic device 14 may communicate with the first electronic device 10 through the second communicator.

When the first electronic device 10 is in a master mode, the second electronic device 14 may be in a slave mode. When the second electronic device 14 is in a slave mode, the second controller 140 of the second electronic device 14 may be connected to the first slave device (e.g., a sensor, another microcontroller, etc.).

The second controller 140 may communicate with the first slave device through a MOSI terminal, a MISO terminal, a SCK (or CLK) terminal, and a CS (or CSB) terminal which transmit/receive a MOSI signal, a MISO signal, a SCK (CLK) signal, and a CS (CSB) signal, respectively. The connection between the second controller 140 of the second electronic device 14 and the slave device may include a MOSI signal, a MISO signal, a SCK (or CLK) signal, and a CS (or CSB) signal. The second controller 140 may transmit the MOSI signal to the first slave device through the MOSI terminal. The second controller 140 may transmit a clock signal to the first slave device through the SCK terminal. The second controller 140 may select the first slave device as a slave device to communicate with the first master device through the CS terminal.

When the second electronic device 14 is in a slave mode, the second controller 140 may receive a communication signal through the second transmission line 150. The second controller 140 may extract the MOSI signal, the SCK signal, and the CS signal from the received communication signal, and output the extracted signals to the first slave device. Also, the second controller 140 may receive the MISO signal from the first slave device, and convert the received MISO signal into a communication signal and output the communication signal to the second transmission line 150. The communication signal output to the second transmission line 150 may transmit to the first transmission line 110 of the first electronic device 10 through the connecting device 12. The first controller 100 of the first electronic device 10 may extract a MISO signal based on the communication signal received at the first transmission line 110, and transmit the extracted MISO signal to the first master device.

Each component of the second electronic device 14 may be connected with the second transmission line 150. The second resistor 152 may be designed to match a specific impedance in order to maximize data transmission efficiency between the second controller 140 and the first controller 100 and minimize reflection on the lines. The first portion 126 of the second isolator and the second portion 154 of the second isolator may be used so that the data is transmitted over the isolation boundary of the connecting device 12 and the second electronic device 14.

FIG. 1 illustrates a serial isolated communication system 1 implemented to support the SPI communication method, however, the configurations and methods for implementing the serial isolated communication system 1 are not limited to the described embodiments. According to an embodiment, the serial isolated communication system 1 may be implemented to support a universal asynchronous receiver and transmitter (UART) method. Those skilled in the art will be able to apply technical modifications and alterations from the serial isolated communication system 1 implemented to support the SPI communication method to a serial isolated communication system implemented to support the UART communication method or other communication methods.

According to an embodiment, the connecting device 12 may be omitted in the serial isolated communication system 1 when the bidirectional communication is possible only with the components of the first electronic device 10 and the second electronic device 14.

Figure 2:
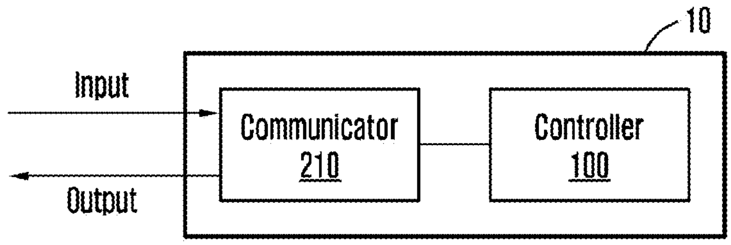
FIG. 2 illustrates a serially isolated electronic device according to an embodiment.

FIG. 2 illustrates a serially isolated electronic device according to an embodiment.

Referring to FIG. 2, a serially isolated electronic device (e.g., the first electronic device 10 or the second electronic device 14 of FIG. 1) may include a communicator and a controller (e.g., the first controller 100 of FIG. 1).

A communicator 210 may be connected to another serially isolated electronic device to perform communication of a controller 100. When the electronic device operates in a master mode, the controller 100 may convert a signal input from a master device (e.g., the first master device described with reference to FIG. 1) and output the converted signal to the communicator 210. The controller 100 may extract a specific signal from a communication signal received through the communicator 210, and transmit the extracted signal to the master device.

When the electronic device operates as a transmission device, the controller 100 may be configured to perform an operation of obtaining data to be transmitted, an operation of generating a plurality of data sets having 2 bits based on the data, an operation of determining a plurality of data pulse signals by encoding the plurality of data sets according to a preset rule, and an operation of transmitting the plurality of data pulse signals to a reception device of the serial isolated communication system. Each of the plurality of data pulse signals may be composed of any two pulses of a first positive pulse having a first amplitude, a second positive pulse having a second amplitude, a first negative pulse having the first amplitude, or a second negative pulse having the second amplitude.

FIG. 2 illustrates the electronic device operating as the transmission device in a master mode, however, operating modes and operating methods of the electronic device are not limited to the described embodiments. According to an embodiment, the electronic device may operate as a reception device at the same time. When the electronic device operates as the reception device, the controller 100 may extract a specific signal from the communication signal received through the communicator 210, and output the extracted signal to the master device.

Figure 3:
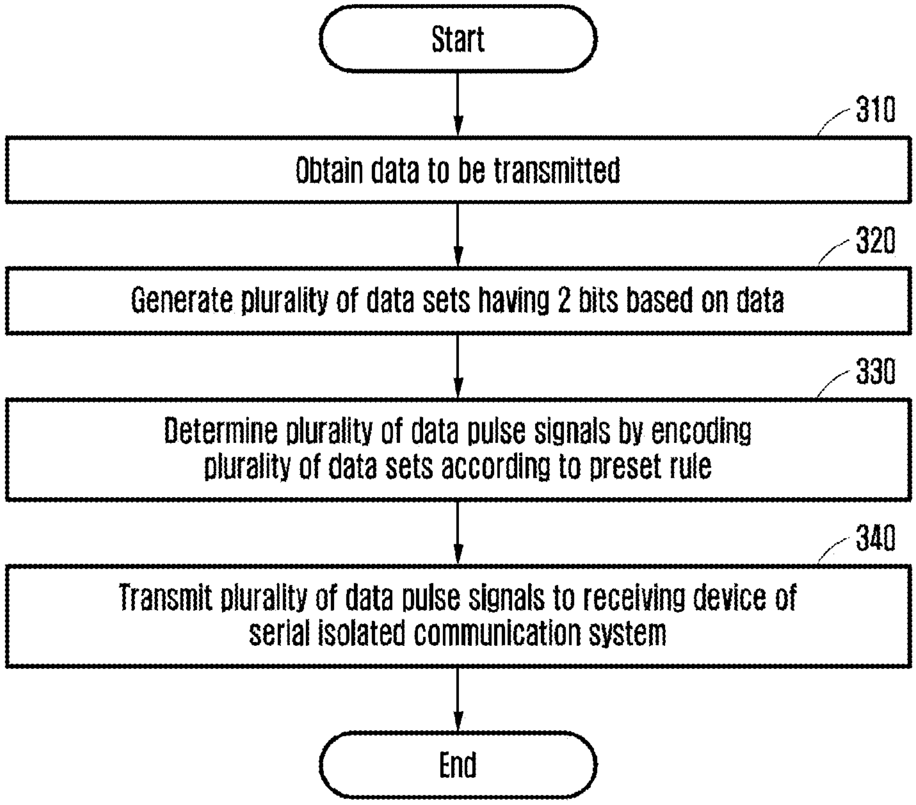
FIG. 3 is a flowchart of a method of transmitting data, performed by a transmission device of a serial isolated communication system according to various embodiments.

FIG. 3 is a flowchart of a method of transmitting data, performed by a transmission device of a serial isolated communication system according to various embodiments.

Operations 310 to 340 below may be performed by a transmission device (e.g., the first electronic device 10 of FIG. 1) of a serial isolated communication system (e.g., the serial isolated communication system 1 of FIG. 1). The transmission device may include a controller (e.g., the first controller 100 of FIG. 1 or the controller 100 of FIG. 2). According to an embodiment, the controller may control serial isolated communication. The transmission device may include a communicator (e.g., the communicator of FIG. 2).

Referring to FIG. 3, the serial isolated communication method is applied to the transmission device of the serial isolated communication system. The serial isolated communication system may further include a reception device, and the transmission device and the reception device may be electrically isolated from each other. For example, when the first electronic device 10 of FIG. 1 described above is in a master mode, the first electronic device 10 of FIG. 1 may operate as a transmission and reception device of the serial isolated communication system. For example, when the second electronic device 14 of FIG. 1 described above is in a slave mode of the serial isolated communication system, it may operate as a transmission and reception device of the serial isolated communication system. For example, the first electronic device 10 of FIG. 1 described above is in a slave mode, the second electronic device 14 of FIG. 1 may operate as a transmission and reception device in a master mode of the serial isolated communication system, and the first electronic device 10 of FIG. 1 may operate as a transmission and reception device in a slave mode of the serial isolated communication system.

Hereinafter, operations 310 to 340 will be described for a case where the first electronic device 10 of FIG. 1 described above is in a master mode.

In operation 310, a controller of a transmission device may obtain data to be transmitted. For example, the controller of the transmission device may obtain data to be transmitted from a master device through a MOSI terminal. The controller may include the MOSI terminal (e.g., the MOSI terminal of FIG. 1), and receive the data to be transmitted from the master device through the MOSI terminal. A method of obtaining the data to be transmitted, performed by the controller of the transmission device is not limited to the described embodiments.

In operation 320, the controller of the transmission device may generate a plurality of data sets having 2 bits based on the data. According to an embodiment, the controller of the transmission device may implement two bit data pieces into one data pulse using an amplitude variance. In order to allocate the two bit data pieces to each data pulse, the controller of the transmission device may divide the obtained data into the data having two bits. The plurality of data sets having 2 bits may be generated based on the divided data. A method of generating the plurality of data sets having 2 bits by the controller of the transmission device is not limited to the described embodiments.

In operation 330, the controller of the transmission device may determine a plurality of data pulse signals by encoding the plurality of data sets according to a preset rule. According to an embodiment, the generated 2-bit data pieces may correspond to each data pulse signal. The controller of the transmission device may determine the plurality of data pulse signals, which are a set of corresponding data pulse signals, by encoding the plurality of data sets, which are a set of 2-bit data pieces according to a preset rule. According to an embodiment, isolated communication data pulse signals may be generated by encoding the plurality of data sets having 2 bits. A method of determining the plurality of data pulse signals by the controller of the transmission device is not limited to the described embodiments.

According to an embodiment, each of the plurality of data pulse signals may be composed of any two pulses of a first positive pulse having a first amplitude, a second positive pulse having a second amplitude, a first negative pulse having the first amplitude, or a second negative pulse having the second amplitude. According to an embodiment, the second amplitude may be two times the first amplitude. The configurations and amplitudes of the plurality of data pulse signals are not limited to the described embodiments.

In operation 340, the controller of the transmission device may transmit the plurality of data pulse signals to a reception device of the serial isolated communication system. In an example, operation 340 may include transmitting the plurality of data pulse signals to the reception device of the serial isolated communication system through a first pin (e.g., an IP pin) of the controller of the transmission device. In an example, operation 340 may further include transmitting a plurality of complementary data pulse signals complementary to the plurality of data pulse signals to the reception device of the serial isolated communication system through a second pin (e.g., an IM pin) of the controller of the transmission device. Hereinafter, referring to FIG. 4A, the plurality of data pulse signals and the plurality of complementary data pulse signals will be described in detail. Hereinafter, a method of transmitting the plurality of data pulse signals to the reception device of the serial isolated communication system will be described in detail with reference to FIG. 5.

Operations 310 to 340 have been described for the case where the first electronic device 10 of FIG. 1 is in a master mode. However, operations 310 to 340 described above may be performed even in a case where the first electronic device 10 of FIG. 1 is in a slave mode according to the design of the serial isolated communication system, and the same method may be performed even when a separate electronic device is a master device.

Figure 4A:
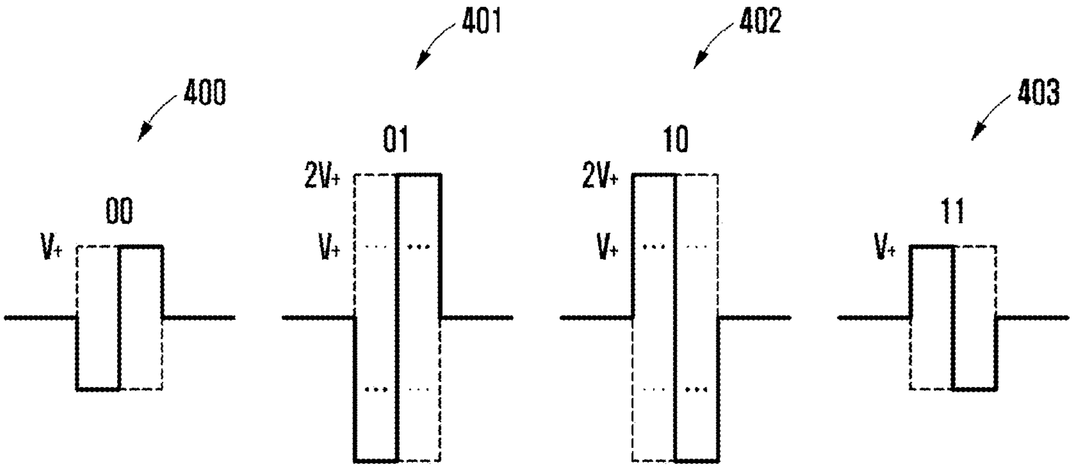
FIG. 4A illustrates a plurality of data pulse signals of a serial isolated communication system according to an embodiment.
Figure 4B:
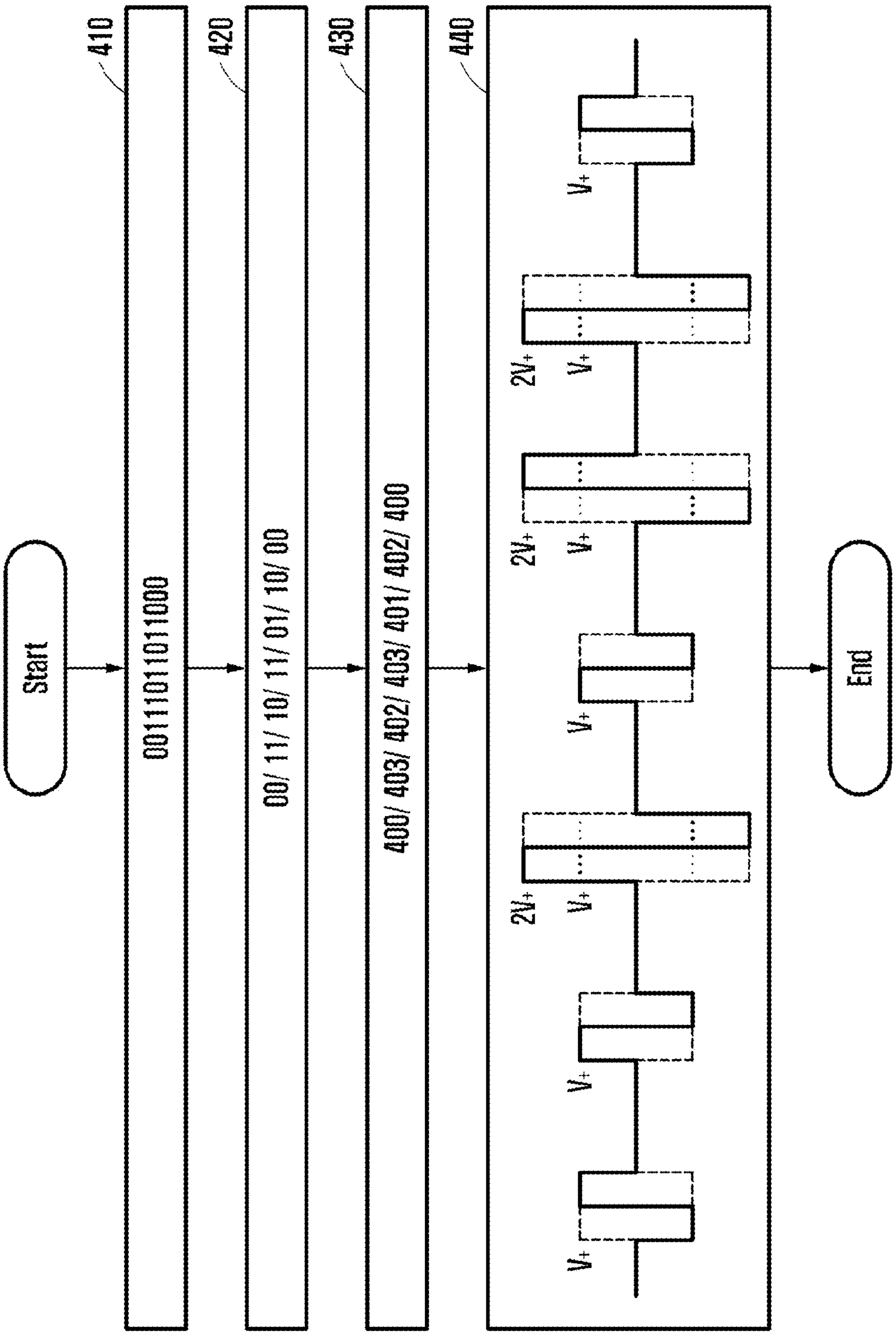
FIG. 4B is a flowchart of a method of transmitting specific data, performed by a transmission device of a serial isolated communication system according to an embodiment.

FIG. 4A illustrates a plurality of data pulse signals of a serial isolated communication system according to an embodiment. FIG. 4B is a flowchart of a method of transmitting specific data, performed by a transmission device of a serial isolated communication system according to an embodiment.

Referring to FIG. 4A, data pulse signals respectively corresponding to 2-bit data pieces are shown.

According to an embodiment, when a first bit and a second bit of a first data set among the plurality of data sets are identical to each other, a first data pulse signal corresponding to the first data set may be composed of the first negative pulse having the first amplitude and the first positive pulse having the first amplitude. For example, data having a value of "00" among the 2-bit data pieces may correspond to a first data pulse signal 400 composed of the first negative pulse having the first amplitude and the first positive pulse having the first amplitude. For example, data having a value of "11" among the 2-bit data pieces may correspond to a fourth data pulse signal 403 composed of the first positive pulse having the first amplitude and the first negative pulse having the first amplitude.

According to an embodiment, when a first bit and a second bit of a second data set among the plurality of data sets are different from each other, a second data pulse signal corresponding to the second data set may be composed of the second negative pulse having the second amplitude and the second positive pulse having the second amplitude. For example, data having a value of "01" among the 2-bit data pieces may correspond to a second data pulse signal 401 composed of the second negative pulse having the second amplitude and the second positive pulse having the second amplitude. For example, data having a value of "10" among the 2-bit data pieces may correspond to a third data pulse signal 402 composed of the second positive pulse having the second amplitude and the second negative pulse having the second amplitude.

According to an embodiment, when a first bit and a second bit of a first data set among the plurality of data sets are identical to each other, a first data pulse signal corresponding to the first data set may be composed of the first positive pulse having the first amplitude and the second negative pulse having the second amplitude.

According to an embodiment, when a first bit and a second bit of a first data set among the plurality of data sets are identical to each other, a first data pulse signal corresponding to the first data set may be composed of the second positive pulse having the second amplitude and the first negative pulse having the first amplitude.

According to an embodiment, when a first bit and a second bit of a first data set among the plurality of data sets are identical to each other, a first data pulse signal corresponding to the first data set may be composed of the second positive pulse having the second amplitude and the second negative pulse having the second amplitude.

According to an embodiment, the plurality of data pulse signals corresponding to the plurality of data sets may be signals transmitted to the reception device of the serial isolated communication system through the first pin of the controller of the transmission device. According to an embodiment, a plurality of complementary data pulse signals complementary to the plurality of data pulse signals corresponding to the plurality of data sets may be signals transmitted to the reception device of the serial isolated communication system through the second pin of the controller of the transmission device. Paired serial communication may be performed through the data pulse signals transmitted through the first pin and the complementary data pulse signals transmitted through the second pin.

According to an embodiment, a method, apparatus, and system for serial isolated communication, in which bidirectional multidata communication is implemented, may be provided using directions of pulses and changes of amplitudes. According to an embodiment, a method, apparatus, and system for serial isolated communication with improved transmission efficiency may be provided by implementing 2-bit data in one data pulse, instead of transmitting 1-bit data to one clock. In addition, in a case of transmitting a specific signal other than data (e.g., CSB signal in case of SPI, START/STOP signal in case of UART, etc.), changes of pulse amplitudes may be used instead of using a width of a pulse or intervals between pulses. Signals using changes in pulse amplitude may have improved signal recognition when being transmitted/received.

FIG. 4A illustrates the data pulse signals according to an embodiment of the data respectively having values of “00”, “01”, “10”, and “11” among 2-bit data pieces, however, the data pulse signal corresponding to each bit data is not limited to the described embodiment. For example, the data having a value of “01” may correspond to the first data pulse signal 400 depending on the settings for the serial isolated communication device and system.

FIG. 4A shows an embodiment in which the data pulse signal corresponding to each bit data is composed of the first positive pulse having the first amplitude and the first negative pulse having the first amplitude or the second positive pulse having the second amplitude and the second negative pulse having the second amplitude, however, the configurations and amplitudes of the plurality of data pulse signals respectively corresponding to the plurality of data sets are not limited to the described embodiments.

Referring to FIG. 4B, a flowchart of a method of transmitting data having a specific value is shown. Operations 410 to 440 below may be performed according to operations 310 to 340 described above with reference to FIG. 3 by a transmission device (e.g., the first electronic device 10 of FIG. 1) of a serial isolated communication system (e.g., the serial isolated communication system 1 of FIG. 1). The transmission device may include a controller (e.g., the first controller 100 of FIG. 1 or the controller 100 of FIG. 2).

In operation 410, the controller of the transmission device may obtain data to be transmitted having a value of “00111011011000”.

In operation 420, the controller of the transmission device may generate a plurality of data sets having 2 bits based on the data having a value of “00111011011000”. The plurality of data sets having 2 bits may include data sets respectively having 2 bits of “00”, “11”, “10”, “11”, “01”, “10”, and “00”.

In operation 430, the controller of the transmission device may determine a plurality of data pulse signals by encoding the data sets respectively having 2 bits of “00”, “11”, “10”, “11”, “01”, “10”, and “00” according to a preset rule.

For example, the 2-bit data pieces and the data pulse signals respectively corresponding thereto described above with reference to FIG. 4A may be used. The data sets respectively having 2 bits of “00”, “11”, “10”, “11”, “01”, “10”, and “00” may correspond to the first data pulse signal 400, the fourth data pulse signal 403, the third data pulse signal 402, the fourth data pulse signal 403, the second data pulse signal 401, the third data pulse signal 402, and the first data pulse signal 400, respectively.

In operation 440, the controller of the transmission device may transmit the plurality of determined data pulse signals to a reception device of the serial isolated communication system.

Figure 5:
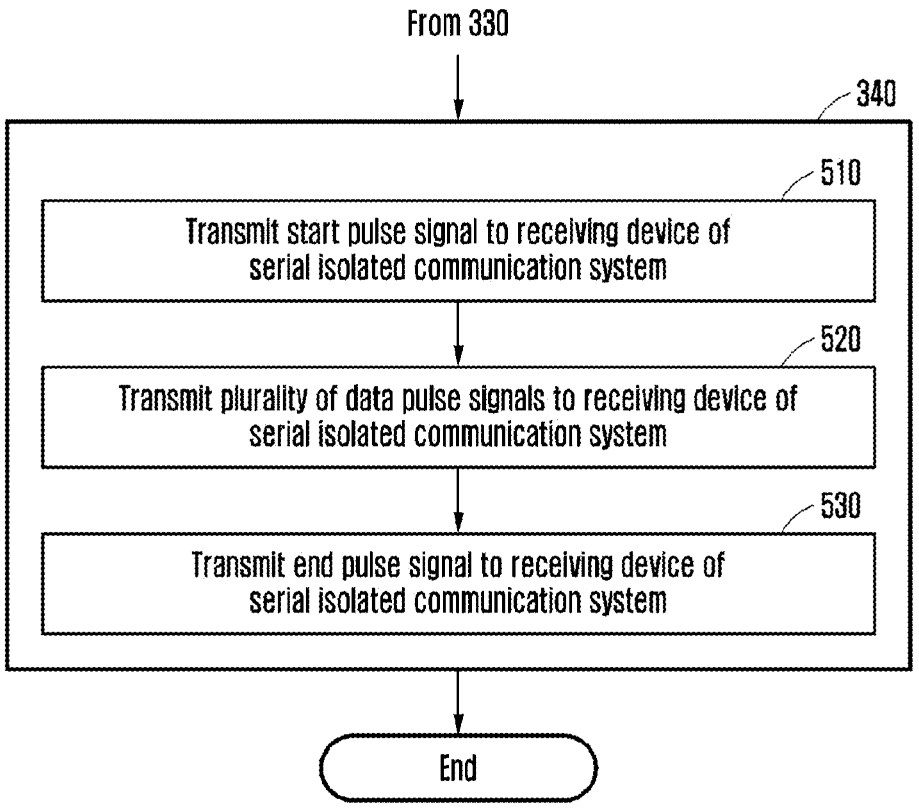
FIG. 5 is a flowchart of a method of transmitting a plurality of data pulse signals to a reception device according to an embodiment.

FIG. 5 is a flowchart of a method of transmitting a plurality of data pulse signals to a reception device according to an embodiment.

According to an embodiment, operation 340 described above with reference to FIG. 3 may further include operations 510 to 530 below. Operations 510 to 530 below may be performed by a transmission device (e.g., the first electronic device 10 of FIG. 1) of a serial isolated communication system (e.g., the serial isolated communication system 1 of FIG. 1). The transmission device may include a controller (e.g., the first controller 100 of FIG. 1 or the controller 100 of FIG. 2).

In operation 510, the controller of the transmission device may transmit a start pulse signal (e.g., a CSB_low signal in a case of the SPI communication, a START signal in a case of the UART communication, etc.) to the reception device of the serial isolated communication system. In an example, before the plurality of data pulse signals are transmitted to the reception device, the start pulse signal may be transmitted to the reception device first in order to notify the reception device that the plurality of data pulse signals will be transmitted next. In an example, the start pulse signal may be transmitted to the reception device of the serial isolated communication system through the first pin of the controller of the transmission device. In an example, a start pulse signal complementary to the start pulse signal may be transmitted to the reception device of the serial isolated communication system through the second pin of the controller of the transmission device.

In operation 520, the controller of the transmission device may transmit the plurality of data pulse signals to the reception device of the serial isolated communication system. In an example, the plurality of data pulse signals may be plurality of data pulse signals determined in operation 330 described above with reference to FIG. 3.

In operation 530, the controller of the transmission device may transmit an end pulse signal (e.g., a CSB_high signal in a case of the SPI communication, a STOP signal in a case of the UART communication, etc.) to the reception device of the serial isolated communication system. In an example, after the plurality of data pulse signals are transmitted to the reception device, the end pulse signal may be additionally transmitted to the reception device in order to notify the reception device that all the plurality of data pulse signals are transmitted. In an example, the end pulse signal may be transmitted to the reception device of the serial isolated communication system through the first pin of the controller of the transmission device. In an example, an end pulse signal complementary to the end pulse signal may be transmitted to the reception device of the serial isolated communication system through the second pin of the controller of the transmission device.

Hereinafter, the start pulse signal, the end pulse signal, and all of pulse signals will be described in detail with reference to FIGS. 6A and 6B.

Figure 6A:
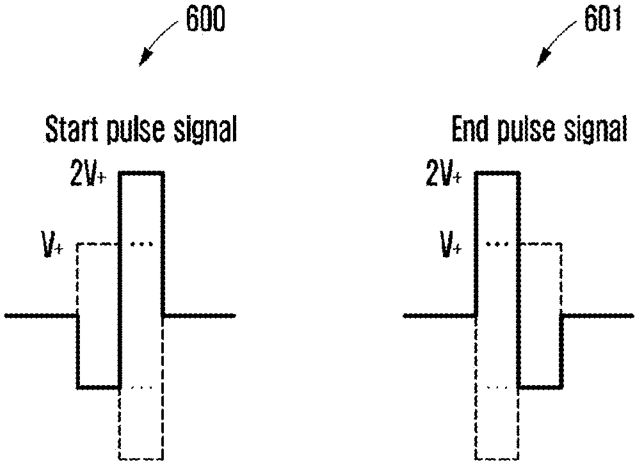
FIG. 6A illustrates a start pulse signal and an end pulse signal of a serial isolated communication system according to an embodiment.

FIG. 6A illustrates a start pulse signal and an end pulse signal of a serial isolated communication system according to an embodiment. FIG. 6B illustrates all pulse signals including a start pulse signal, a plurality of data pulse signals, and an end pulse signal of a serial isolated communication system according to an embodiment.

Referring to FIG. 6A, the start pulse signal and the end pulse signal are shown.

In an example, the start pulse signal and the end pulse signal may be different signals each composed of two pulses having different amplitudes and different signs (e.g., positive or negative). For example, the start pulse signal and the end pulse signal may be different signals each composed of any two pulses among the first positive pulse, the second positive pulse, the first negative pulse, or the second negative pulse.

For example, the start pulse signal shown in FIG. 6A may correspond to a start pulse signal 600 composed of the first negative pulse having the first amplitude and the second positive pulse having the second amplitude. For example, the end pulse signal shown in FIG. 6A may correspond to an end pulse signal 601 composed of the second positive pulse having the second amplitude and the first negative pulse having the first amplitude.

In an example, the start pulse signal or the end pulse signal may be a signal transmitted to the reception device of the serial isolated communication system through the first pin of the controller of the transmission device. For example, a complementary start pulse signal or a complementary end pulse signal to the start pulse signal or the end pulse signal may be a signal transmitted to the reception device of the serial isolated communication system through the second pin of the controller of the transmission device. The paired serial communication may be performed through the start pulse signal or the end pulse signal transmitted through the first pin and the complementary start pulse signal or the complementary end pulse signal transmitted through the second pin.

FIG. 6A illustrates the pulse signals according to an embodiment which are the start pulse signal and the end pulse signal, however, the data pulse signal corresponding to each signal is not limited to the described embodiments. For example, depending on the settings for serial isolated communication device and system, the start pulse signal may be composed of the first positive pulse having the first amplitude and the second negative pulse having the second amplitude. For example, the end pulse signal may be composed of the second negative pulse having the second amplitude and the first positive pulse having the first amplitude. According to an embodiment, the start pulse signal may correspond to the pulse signal 601 of FIG. 6A, the end pulse signal may correspond to the pulse signal 600 of FIG. 6A. The configurations and amplitudes of the data pulse signals corresponding to each of the start pulse signal and the end pulse signal are not limited to the described embodiments.

Figure 6B:
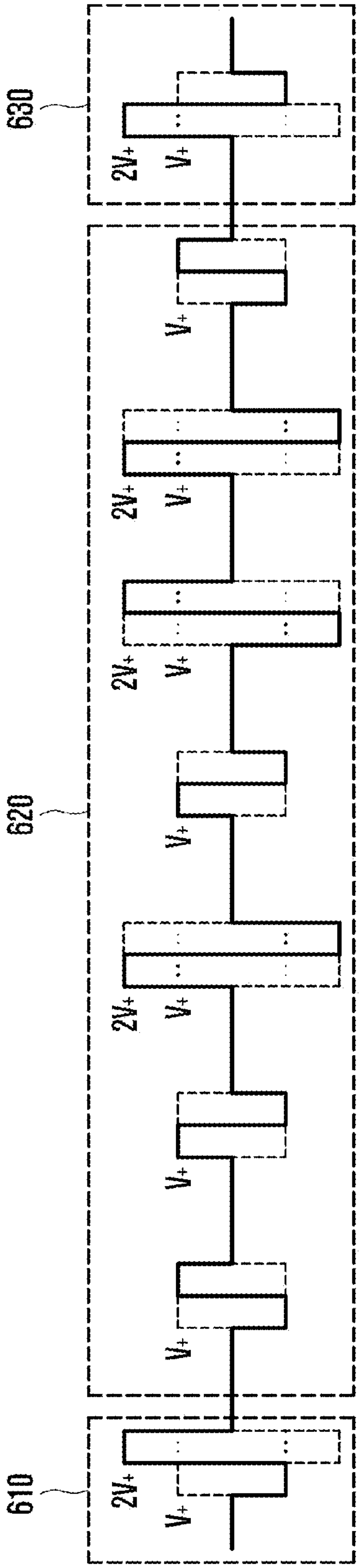
FIG. 6B illustrates all pulse signals including a start pulse signal, a plurality of data pulse signals, and an end pulse signal of a serial isolated communication system according to an embodiment.

Referring to FIG. 6B, all pulse signals including the start pulse signal and the end pulse signal are shown.

According to operation 510 described above with reference to FIG. 5, the controller of the transmission device may transmit a start pulse signal 610 (e.g., the start pulse signal 600 of FIG. 6A) to the reception device of the serial isolated communication system.

According to operation 520 described above with reference to FIG. 5, the controller of the transmission device may transmit a plurality of data pulse signals 620 (e.g., the plurality of data pulse signals described above with reference to operation 440 of FIG. 4B) to the reception device of the serial isolated communication system.

According to operation 530 described above with reference to FIG. 5, the controller of the transmission device may transmit an end pulse signal 630 (e.g., the end pulse signal 601 of FIG. 6A) to the reception device of the serial isolated communication system.

Figure 7:
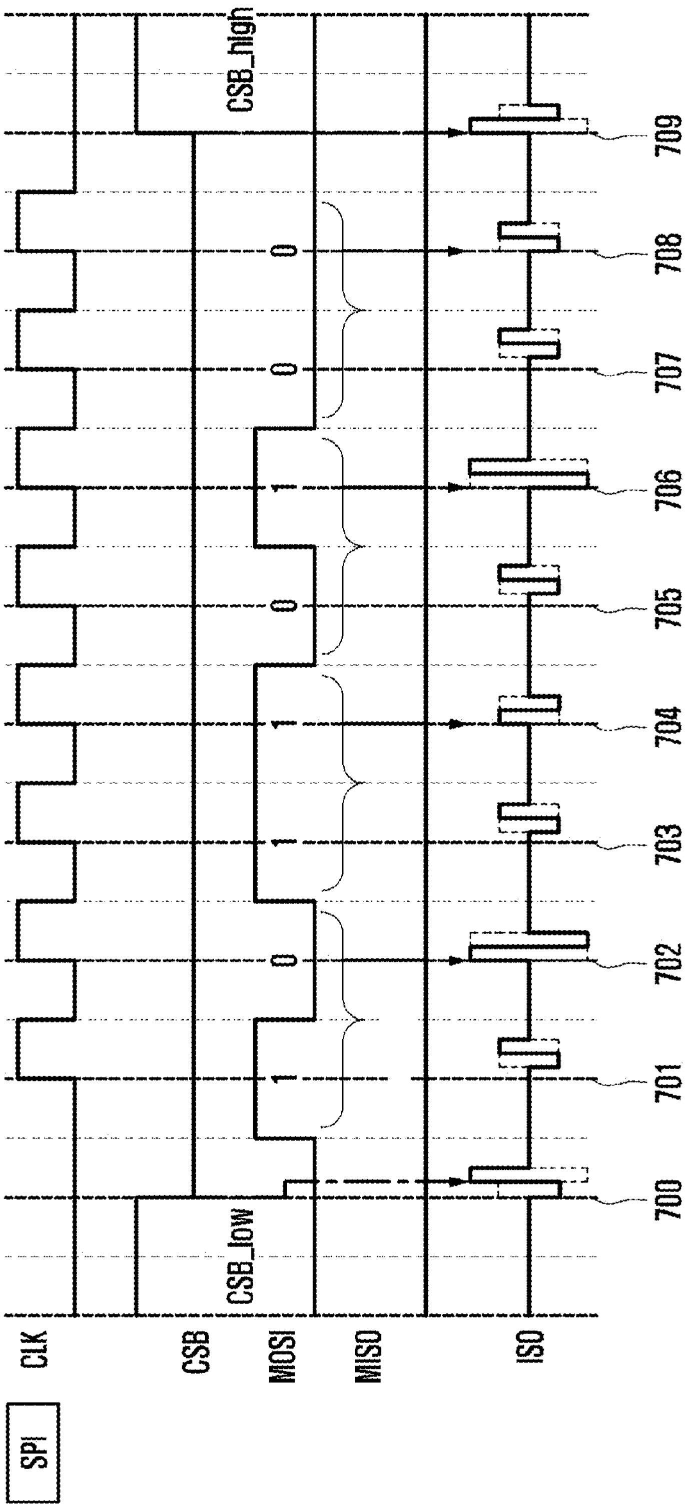
FIG. 7 illustrates an example of a timing diagram of a serial isolated communication system implemented to support a serial peripheral interface (SPI) communication method according to an embodiment.

FIG. 7 illustrates an example of a timing diagram of a serial isolated communication system implemented to support a SPI communication method according to an embodiment.

Referring to FIG. 7, CLK (or SCK) indicates a clock signal, CSB (or CS) indicates a chip select signal, MOSI indicates a master output/slave input signal, MISO indicates a master input/slave output signal, and ISO indicates a corresponding data pulse signal.

The controller of the transmission device may obtain data to be transmitted according to MOSI (the master output/slave input signal). The data to be transmitted as shown in FIG. 7 corresponds to "10110100". The controller of the transmission device may generate a plurality of data sets having 2 bits based on the data. The plurality of generated data sets having 2 bits shown in FIG. 7 corresponds to "10", "11", "01", and "00". The controller of the transmission device may determine a plurality of data pulse signals by encoding the plurality of data sets according to a preset rule. The plurality of determined data pulse signals shown in FIG. 7 correspond to the third data pulse signal 402, the fourth data pulse signal 403, the second data pulse signal 401, and the first data pulse signal 400 described above with reference to FIG. 4A.

The controller of the transmission device may transmit a start pulse signal 700 (e.g., the start pulse signal 600 of FIG. 6A) to the reception device. In a case of the serial isolated communication system implemented to support the SPI communication method, the start pulse signal 700 may refer to a CSB_low signal. The controller of the transmission device may transmit a plurality of determined data pulse signals 702, 704, 706, and 708 to the reception device of the serial isolated communication system. The controller of the transmission device may transmit an end pulse signal 709 (e.g., the end pulse signal 601 of FIG. 6A) to the reception device. In a case of the serial isolated communication system implemented to support the SPI communication method, the end pulse signal 709 may refer to a CSB_high signal.

According to an embodiment, in a case of the serial isolated communication system implemented to support the SPI communication method, additional data pulse signals 701, 703, 705, and 707 may be transmitted together by a MISO signal.

Figure 8:
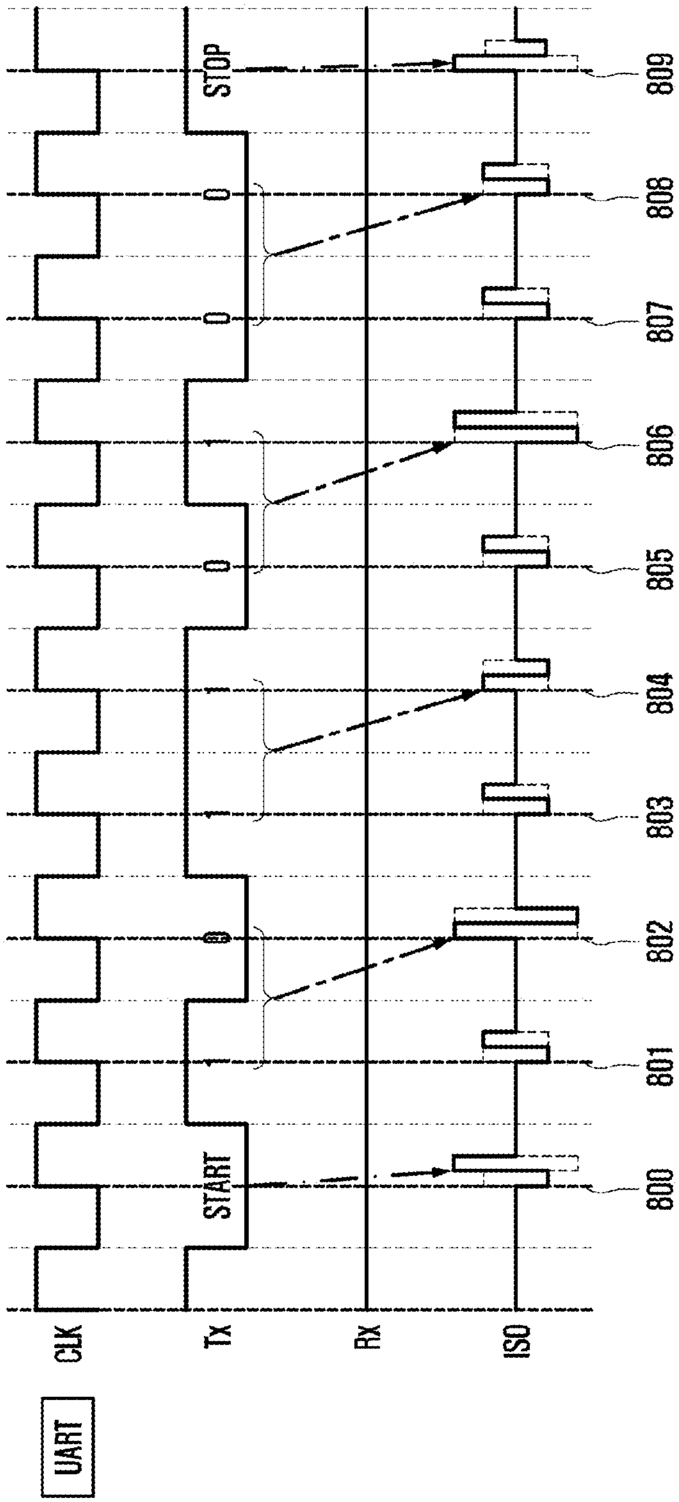
FIG. 8 illustrates an example of a timing diagram of a serial isolated communication system implemented to support a universal asynchronous receiver and transmitter (UART) communication method according to an embodiment.

FIG. 8 illustrates an example of a timing diagram of a serial isolated communication system implemented to support a UART communication method according to an embodiment.

According to an embodiment, the serial isolated communication system may be implemented to support the UART communication method. Referring to FIG. 8, CLK (or SCK) indicates a clock signal, Tx and Rx indicate data transmission signals, and ISO indicates a corresponding data pulse signal. A transmission device of the serial isolated communication system implemented to support the UART communication method may include a controller.

The controller of the transmission device may transmit and receive data to be transmitted, according to the Tx and Rx signals. The data to be transmitted shown in FIG. 8 corresponds to "10110100". The controller of the transmission device may generate a plurality of data sets having 2 bits based on the data. The plurality of generated data sets having 2 bits shown in FIG. 8 corresponds to "10", "11", "01", and "00". The controller of the transmission device may determine a plurality of data pulse signals by encoding the plurality of data sets according to a preset rule. The plurality of determined data pulse signals shown in FIG. 8 corresponds to the third data pulse signal 402, the fourth data pulse signal 403, the second data pulse signal 401, and the first data pulse signal 400 described above with reference to FIG. 4A.

The controller of the transmission device may generate a start pulse signal 800 (e.g., the start pulse signal 600 of FIG. 6A) to the reception device according to the Tx signal. In a case of the serial isolated communication system implemented to support the UART communication method, the start pulse signal 800 may refer to a START signal. The controller of the transmission device may transmit a plurality of determined data pulse signals 802, 804, 806, and 808 to the reception device of the serial isolated communication system. The controller of the transmission device may transmit an end pulse signal 809 (e.g., the end pulse signal 601 of FIG. 6A) to the reception device according to the Tx signal. In a case of the serial isolated communication system implemented to support the UART communication method, the end pulse signal 809 may refer to a STOP signal.

According to an embodiment, in a case of the serial isolated communication system implemented to support the UART communication method, additional data pulse signals 801, 803, 805, and 807 may be transmitted together by the Rx signal.

Figure 9:
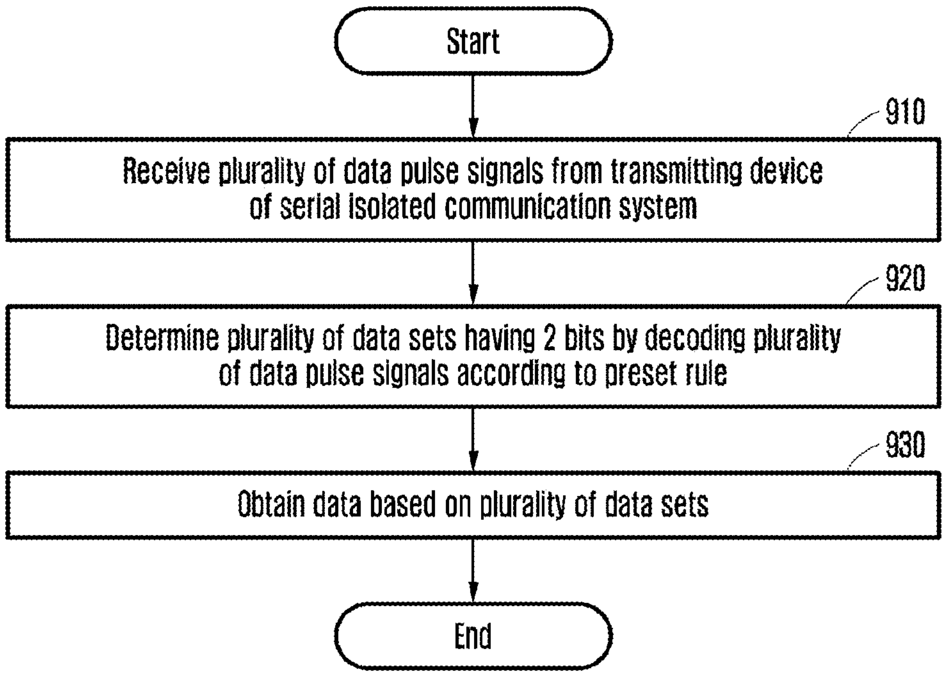
FIG. 9 is a flowchart of a method of receiving data, performed by a reception device of a serial isolated communication system according to various embodiments.

FIG. 9 is a flowchart of a method of receiving data, performed by a reception device of a serial isolated communication system according to various embodiments.

Operations 910 to 930 below may be performed by a reception device (e.g., the second electronic device 14 of FIG. 1) of a serial isolated communication system (e.g., the serial isolated communication system 1 of FIG. 1). The reception device may include a controller (e.g., the second controller 140 of FIG. 1). According to an embodiment, the controller may control serial isolated communication. The reception device may include a communicator.

Referring to FIG. 9, the serial isolated communication method is applied to the reception device of the serial isolated communication system. The serial isolated communication system may further include a transmission device, the transmission device and the reception device may be electrically isolated from each other. For example, when the second electronic device 14 of FIG. 1 described above is in a slave mode, the second electronic device 14 of FIG. 1 may operate as the reception device of the serial isolated communication system for a MOSI signal, and the first electronic device 10 of FIG. 1 may operate as the transmission device of the serial isolated communication system for a MOSI signal. For example, when the second electronic device 14 of FIG. 1 described above is in a master mode, the first electronic device 10 of FIG. 1 may operate as the reception device of the serial isolated communication system for a MOSI signal, and the second electronic device 14 of FIG. 1 may operate as the transmission device of the serial isolated communication system for a MOSI signal.

Hereinafter, operations 910 to 930 will be described for a case where the second electronic device 14 of FIG. 1 described above is in a slave mode.

In operation 910, the controller of the reception device may receive a plurality of data pulse signals from the transmission device of the serial isolated communication system. For example, the controller of the reception device may receive the plurality of data pulse signals from the transmission device of the serial isolated communication system through the communicator.

According to an embodiment, the receiving of the plurality of data pulse signals from the transmission device of the serial isolated communication system may include receiving a start pulse signal from the transmission device of the serial isolated communication system, receiving the plurality of data pulse signals from the transmission device of the serial isolated communication system, and receiving an end pulse signal from the transmission device of the serial isolated communication system. The method of receiving the plurality of data pulse signals by the controller of the reception device is not limited to the described embodiments.

In operation 920, the controller of the reception device may determine a plurality of data sets having 2 bits by decoding the plurality of data pulse signals according to a preset rule. According to an embodiment, the data pulse signal may correspond to each 2-bit data. The controller of the reception device may determine the plurality of data sets having 2 bits, which is a set of corresponding 2-bit data pieces, by decoding the plurality of data pulse signals, which is a set of data pulse signals, according to the preset rule. The method of determining the plurality of data sets having 2 bits by the controller of the reception device is not limited to the described embodiments.

According to an embodiment, each of the plurality of data pulse signals may be composed of any two pulses of a first positive pulse having a first amplitude, a second positive pulse having a second amplitude, a first negative pulse having the first amplitude, or a second negative pulse having the second amplitude.

According to an embodiment, when a first bit and a second bit of a first data set among the plurality of data sets are identical to each other, a first data pulse signal corresponding to the first data set may be composed of the first positive pulse having the first amplitude and the first negative pulse having the first amplitude. According to an embodiment, when a first bit and a second bit of a second data set among the plurality of data sets are different from each other, a second data pulse signal corresponding to the second data set may be composed of the second positive pulse having the second amplitude and the second negative pulse having the second amplitude. The configurations and amplitudes of each of the plurality of data pulse signals are not limited to the described embodiments.

In operation 930, the controller of the reception device may obtain data based on the plurality of data sets. According to an embodiment, the controller of the reception device may obtain data based on the plurality of data sets having 2 bits. The obtained data may be data transmitted from a master device in operation 310 of FIG. 3. The method of obtaining the data by the controller of the reception device is not limited to the described embodiments.

Operations 910 to 930 described above have described a case where the second electronic device 14 of FIG. 1 corresponds to the reception device in a slave mode, however, according to the design of the serial isolated communication system, the second electronic device 14 of FIG. 1 may correspond to the reception device in a master mode, and a separate electronic device may perform the reception operation as a slave device.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The devices described above may be configured to act as one or more software modules in order to perform the operations of the embodiments, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software may also be distributed over network-coupled computer systems so that the software is stored and executed in a distributed fashion. The software and data may be stored by one or more non-transitory computer-readable recording mediums.

As described above, although the embodiments have been described with reference to the limited drawings, a person skilled in the art may apply various technical modifications and variations based thereon. For example, suitable results may be achieved if the described techniques are performed in a different order, and/or if components in a described system, architecture, device, or circuit are combined in a different manner, or replaced or supplemented by other components or their equivalents.

Therefore, other implementations, other embodiments, and equivalents of the claims are within the scope of the following claims.

What is claimed is:

1. A method of transmitting data, performed by a transmission device of a serial isolated communication system, the method comprising:

obtaining data to be transmitted;

generating a plurality of data sets having 2 bits based on the data;

determining a plurality of data pulse signals by encoding the plurality of data sets according to a preset rule; and transmitting the plurality of data pulse signals to a reception device of the serial isolated communication system, wherein each of the plurality of data pulse signals is composed of any two pulses of a first positive pulse having a first amplitude, a second positive pulse having a second amplitude, a first negative pulse having the first amplitude, or a second negative pulse having the second amplitude, wherein a first data pulse signal among the plurality of data pulse signals is composed of a preceding first negative pulse having the first amplitude and a succeeding first positive pulse having the first amplitude, wherein a second data pulse signal among the plurality of data pulse signals is composed of a preceding second negative pulse having the second amplitude and a succeeding second positive pulse having the second amplitude, wherein a third data pulse signal among the plurality of data pulse signals is composed of a preceding second positive pulse having the second amplitude and a succeeding second negative pulse having the second amplitude, and wherein a fourth data pulse signal among the plurality of data pulse signals is composed of a preceding first positive pulse having the first amplitude and a succeeding first negative pulse having the first amplitude.

2. The method of claim 1, wherein the transmitting of the plurality of data pulse signals to the reception device of the serial isolated communication system comprises:

transmitting a start pulse signal to the reception device of the serial isolated communication system;

transmitting the plurality of data pulse signals to the reception device of the serial isolated communication system; and transmitting an end pulse signal to the reception device of the serial isolated communication system, wherein the start pulse signal and the end pulse signal are different signals each composed of any two pulses of the first positive pulse, the second positive pulse, the first negative pulse, or the second negative pulse, and wherein each of the start pulse signal and the end pulse signal is composed of two pulses having an amplitude of a preceding pulse and an amplitude of a succeeding pulse different from the amplitude of the preceding pulse.

3. The method of claim 1, wherein the second amplitude is two times the first amplitude.

4. The method of claim 1, wherein the serial isolated communication system is implemented to support a serial peripheral interface (SPI) communication method.

5. The method of claim 1, wherein the serial isolated communication system is implemented to support a universal asynchronous receiver and transmitter (UART) communication method.

6. The method of claim 1, wherein the transmitting of the plurality of data pulse signals to the reception device of the serial isolated communication system comprises transmitting the plurality of data pulse signals to the reception device of the serial isolated communication system through a first pin of a controller of the transmission device.

7. The method of claim 6, wherein the transmitting of the plurality of data pulse signals to the reception device of the serial isolated communication system further comprises transmitting a plurality of complementary data pulse signals complementary to the plurality of data pulse signals to the reception device of the serial isolated communication system through a second pin of the controller of the transmission device.

8. A transmission device of a serial isolated communication system, the transmission device comprising:

at least one controller; and a communicator configured to perform communication of the controller, wherein the controller is configured to perform:

obtaining data to be transmitted;

generating a plurality of data sets having 2 bits based on the data;

determining a plurality of data pulse signals by encoding the plurality of data sets according to a preset rule; and transmitting the plurality of data pulse signals to a reception device of the serial isolated communication system, and each of the plurality of data pulse signals is composed of any two pulses of a first positive pulse having a first amplitude, a second positive pulse having a second amplitude, a first negative pulse having the first amplitude, or a second negative pulse having the second amplitude, wherein a first data pulse signal among the plurality of data pulse signals is composed of a preceding first negative pulse having the first amplitude and a succeeding first positive pulse having the first amplitude, wherein a second data pulse signal among the plurality of data pulse signals is composed of a preceding second negative pulse having the second amplitude and a succeeding second positive pulse having the second amplitude, wherein a third data pulse signal among the plurality of data pulse signals is composed of a preceding second positive pulse having the second amplitude and a succeeding second negative pulse having the second amplitude, and wherein a fourth data pulse signal among the plurality of data pulse signals is composed of a preceding first positive pulse having the first amplitude and a succeeding first negative pulse having the first amplitude.

9. The transmission device of claim 8, wherein the transmitting of the plurality of data pulse signals to the reception device of the serial isolated communication system comprises:

transmitting a start pulse signal to the reception device of the serial isolated communication system;

transmitting the plurality of data pulse signals to the reception device of the serial isolated communication system; and transmitting an end pulse signal to the reception device of the serial isolated communication system, wherein the start pulse signal and the end pulse signal are different signals each composed of any two pulses of the first positive pulse, the second positive pulse, the first negative pulse, or the second negative pulse, and wherein each of the start pulse signal and the end pulse signal is composed of two pulses having an amplitude of a preceding pulse and an amplitude of a succeeding pulse different from the amplitude of the preceding pulse.

10. The transmission device of claim 8, wherein the transmitting of the plurality of data pulse signals to the reception device of the serial isolated communication system comprises transmitting the plurality of data pulse signals to the reception device of the serial isolated communication system through a first pin of a controller of the transmission device.

11. The transmission device of claim 10, wherein the transmitting of the plurality of data pulse signals to the reception device of the serial isolated communication system further comprises transmitting a plurality of complementary data pulse signals complementary to the plurality of data pulse signals to the reception device of the serial isolated communication system through a second pin of the controller of the transmission device.

12. A method of receiving data, performed by a reception device of a serial isolated communication system, the method comprising:

receiving a plurality of data pulse signals from a transmission device of the serial isolated communication system;

determining a plurality of data sets having 2 bits by decoding the plurality of data pulse signals according to a preset rule; and obtaining data based on the plurality of data sets, wherein each of the plurality of data pulse signals is composed of any two pulses of a first positive pulse having a first amplitude, a second positive pulse having a second amplitude, a first negative pulse having the first amplitude, or a second negative pulse having the second amplitude, wherein a first data pulse signal among the plurality of data pulse signals is composed of a preceding first negative pulse having the first amplitude and a succeeding first positive pulse having the first amplitude, wherein a second data pulse signal among the plurality of data pulse signals is composed of a preceding second negative pulse having the second amplitude and a succeeding second positive pulse having the second amplitude, wherein a third data pulse signal among the plurality of data pulse signals is composed of a preceding second positive pulse having the second amplitude and a succeeding second negative pulse having the second amplitude, and wherein a fourth data pulse signal among the plurality of data pulse signals is composed of a preceding first positive pulse having the first amplitude and a succeeding first negative pulse having the first amplitude.

13. The method of claim 12, wherein the receiving of the plurality of data pulse signals from the transmission device of the serial isolated communication system comprises:

receiving a start pulse signal from the transmission device of the serial isolated communication system;

receiving the plurality of data pulse signals from the transmission device of the serial isolated communication system; and receiving an end pulse signal from the transmission device of the serial isolated communication system, wherein the start pulse signal and the end pulse signal are different signals each composed of any two pulses of the first positive pulse, the second positive pulse, the first negative pulse, or the second negative pulse, and wherein each of the start pulse signal and the end pulse signal is composed of two pulses having an amplitude of a preceding pulse and an amplitude of a succeeding pulse different from the amplitude of the preceding pulse.

* * * * *